Jan. 15, 1935.  J. W. GREIG  1,988,006
DIRECTION FINDING SYSTEM
Filed Oct. 15, 1931  2 Sheets-Sheet 1
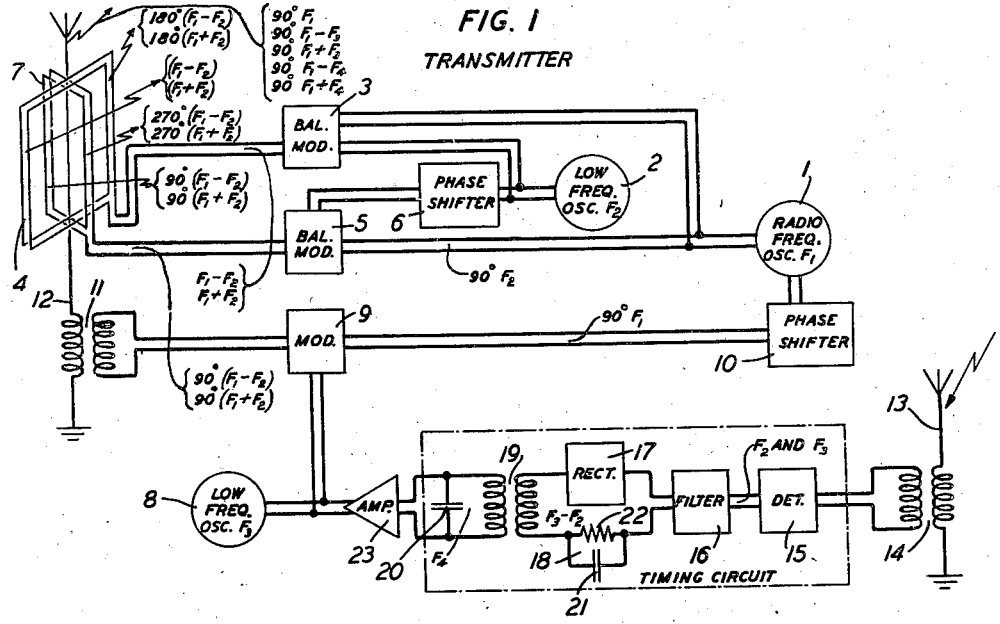
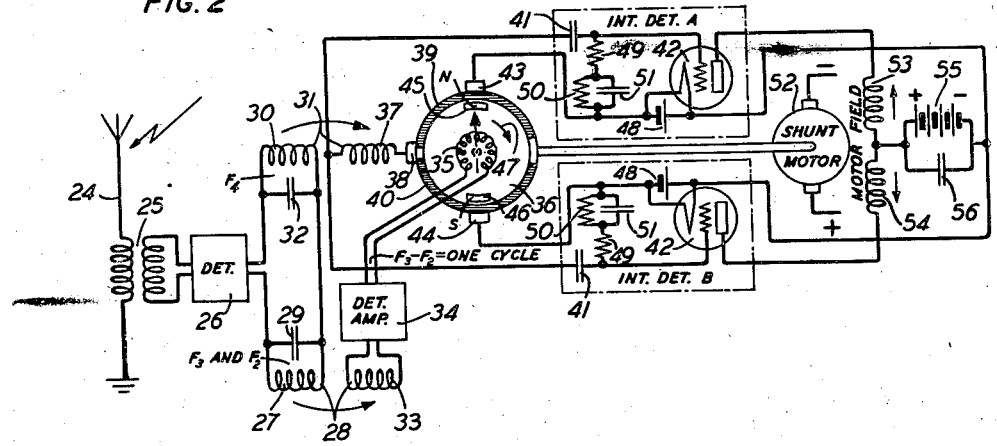
INVENTOR
J. W. GREIG
BY
ATTORNEY Jan. 15, 1935. J. W. GREIG 1,988,006
DIRECTION FINDING SYSTEM
Filed Oct. 15, 1931 2 Sheets-Sheet 2
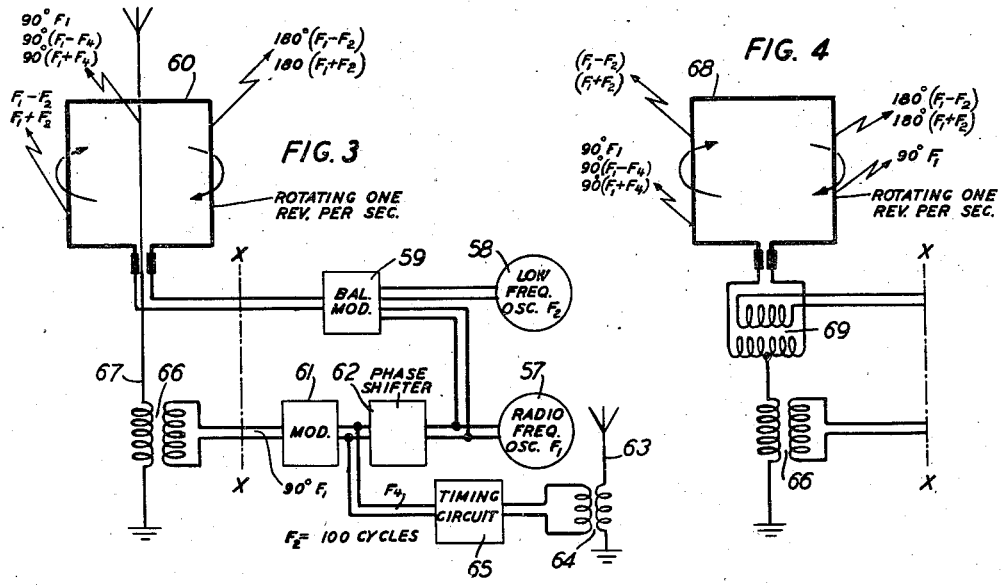
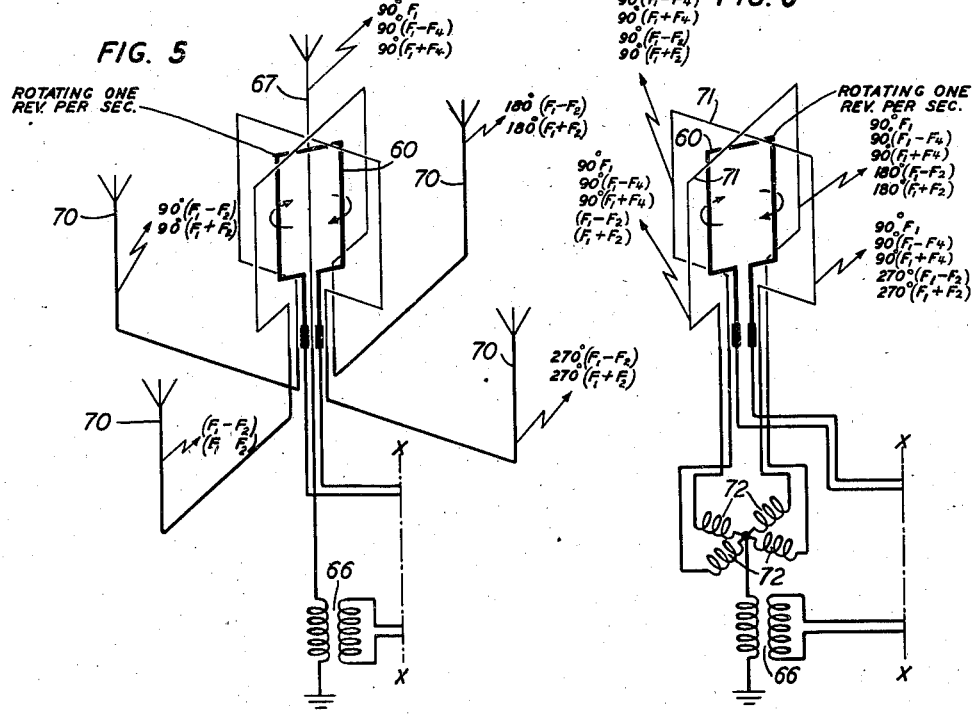
INVENTOR
J. W. GREIG
BY *Guy T. Morris*
ATTORNEY Patented Jan. 15, 1935

1,988,006

UNITED STATES PATENT OFFICE 1,988,006

DIRECTION FINDING SYSTEM

John W. Greig, Little Falls, N. J., assignor to Bell Telephone Laboratories, Incorporated, New York, N. Y., a corporation of New York Application October 15, 1931, Serial No. 568,902

14 Claims. (Cl. 250—11)

This invention relates to methods of, and means for, radio direction finding and more especially to direction finding systems in which a rotating field is transmitted from a fixed station for the purpose of guiding a mobile station, such as an airship, along a given course.

Various direction finding systems are in use at present which utilize a transmitter at the fixed or beacon station and a receiver at the mobile station. In certain of these systems, such as those disclosed in Patent 1,815,246 issued on July 21, 1931 to Englund and in Patent 1,933,248, issued October 31, 1933 to C. H. Evans and applicant which have been assigned to the assignee of the present application, the phase of a rotating single sideband wave as received at the mobile station is compared to that of a non-directional single sideband wave for the purpose of enabling the pilot to ascertain the position or direction of the beacon station. In a somewhat different system, a non-directional characteristic pulse is transmitted from the beacon station when the slowly rotating wave, also transmitted from the beacon station, has a certain direction, as for example, north, and at the receiver the pilot, knowing the angular velocity of the rotating wave, computes his position with respect to the beacon after determining the time interval between the transmission of the characteristic pulse and the time when the rotating beam is a maximum at the receiver.

The present invention employs certain features of each of the above systems and at the same time avoids certain inherent disadvantages associated with other features of the systems. In addition, several novel and important features are included in the system of the invention, so that, by means of this invention, the mobile station may be guided along a definite course in a simple and accurate manner.

It is one object of this invention to provide means for determining the direction of a radio beacon station in a more efficient manner than heretofore accomplished.

It is another object of this invention to provide a continuous directional reading at the mobile station in a direction finding system which utilizes a characteristic pulse.

According to one embodiment of this invention, two sidebands comprising a carrier wave modulated by 59 cycles are transmitted in the form of a rotating figure-of-eight pattern from the beacon station, the carrier being suppressed. Also two non-directional sidebands comprising a carrier wave of the same frequency as the suppressed carrier but in quadrature thereto and modulated by 60 cycles are transmitted from the beacon station. When the difference frequency between the rotating sidebands and the non-directional sidebands, that is, the detected one cycle rotating current (used here as an "orienting" current) is a maximum in a certain direction, say north, a non-directional pulse comprising a carrier modulated by 3000 cycles is transmitted, a special timing circuit being employed to insure the correct timing of the pulse. A one cycle current is obtained at the receiver from the 59 cycle and the 60 cycle components, this one cycle current having the space-phase characteristics of the rotating sideband waves concerned in its production. The modulation of the 59 cycle sideband and the carrier is accomplished as explained in Patent 1,922,677, issued August 15, 1933 to A. B. Bailey and applicant.

The detected 3000 cycle pulse is employed to synchronize the physical rotation of two magnetic poles, the field of which serves as the rotating field of a synchroscope, with the detected rotating one cycle orienting current in the timing circuit. The rotor of the synchroscope is energized by such detected one cycle current, produced by the beat between the 59 and 60 cycle components. Since the time when the one cycle current is a maximum is governed by the position of the mobile station with respect to the beacon station on account of the above space-phase characteristic, the phase relation as shown by the pointer of the synchroscope between the one cycle current and the rotating field of the poles indicates the bearing of the plane with respect to the beacon station.

The invention will be better understood from the following description taken in connection with the drawings in which:

Fig. 1 illustrates a transmitter at the beacon station arranged to transmit two sets of double sidebands with suppressed carriers in accordance with the invention;

Fig. 2 illustrates a receiver designed to cooperate with the transmitter of Fig. 1;

Fig. 3 illustrates a transmitter which is arranged to transmit one set of double sidebands with suppressed carrier and may be substituted for that shown in Fig. 1; and Figs. 4, 5 and 6 illustrate different antenna systems any one of which may be substituted for the antenna system shown in Fig. 3 at the left of the line X—X.

On the drawings, like reference numerals designate elements of similar function.

Referring to Fig. 1, reference numeral 1 designates a radio frequency oscillator generating a frequency $F_1$ and numeral 2 denotes a low frequency oscillator supplying a current of frequency $F_2$, as for example 59 cycles. Oscillators 1 and 2 are associated with a balanced modulator 3, which, in turn, is connected to a loop 4. These oscillators are also connected to another balanced modulator 5, the low frequency oscillator 2 being connected to this balanced modulator through phase shifter 6. The output terminals of balanced modulator 5 are associated with loop 7 which is positioned at right angles to loop 4. Reference numeral 8 designates another low frequency oscillator supplying a current of frequency $F_3$, as for example 60 cycles. Radio frequency oscillator 1 and low frequency oscillator 8 are both associated with unbalanced modulator 9, a phase shifter 10 being included between oscillator 1 and modulator 9. The output of modulator 9 is supplied by means of transformer 11 to the non-directional antenna 12. The phase shifters 6 and 10 are designed to shift the phases of the currents supplied to them by substantially 90°.

Reference numeral 13 represents a small timing antenna positioned in a certain direction, as for example, north, with respect to the radiation system comprising antennas 4, 7 and 12, and at a sufficient distance to pick up the true radiation field. The antenna 13 is inductively coupled by means of transformer 14 to a timing circuit comprising detector 15, filter 16, vacuum tube rectifier 17, leak circuit 18, transformer 19 and condenser 20. Leak circuit 18 comprises condenser 21 and resistance 22. Condenser 20 and the secondary winding of transformer 19 constitute a filter which permits the passage of current of low frequency $F_4$ to amplifier 23. For convenience, $F_4$ is assumed to be 3000 cycles. The output of amplifier 23 modulates a portion of the output of oscillator 1, the modulated waves and unsuppressed carrier being radiated from antenna 12.

Referring to Fig. 2 reference numeral 24 designates a non-directional receiving antenna which is inductively coupled by means of transformer 25 to a detector 26. Reference numeral 27 designates the primary winding of transformer 28 and numeral 29 designates a condenser which, with primary winding 27, forms a tuned circuit for current of frequencies $F_2$ and $F_3$. Similarly, the primary winding 30 of transformer 31 and condenser 32 form a tuned circuit for current of frequency $F_4$. The two tuned circuits are in series with each other in the output of detector 26. Reference numeral 33 designates the secondary winding of transformer 28 and numeral 35 denotes the rotor winding of synchroscope 36, the secondary winding 33 and the rotor winding 35 being connected, respectively, to the input and the output terminals of the detector amplifier 34.

Reference numeral 37 designates the secondary winding of transformer 31, one terminal of which winding is associated with brush 38 which, in turn, is associated with commutator segments 39 and 40 of the synchroscope 36. The other terminal of winding 37 is connected through condensers 41 to the control electrodes of the vacuum tubes 42 in the integrating detectors A and B. The cathodes of tubes 42 in integrating detectors A and B are associated with the commutator segments by means of brushes 43 and 44. The stator field for the synchroscope 36 is supplied by the north magnetic pole 45 and the south magnetic pole 46, which revolve as indicated by the arrow 47.

Each of the condensers 41 in the integrating detectors has a low impedance to currents of frequency $F_4$ and high impedance to currents of the order of $F_3-F_2$. The batteries 48 supply heating energy to the cathodes of tubes 42. A special leak circuit comprising resistance 49, resistance 50 and condenser 51 is connected across the input terminals of each of the vacuum tubes 42, resistance 50 being preferably about ten times the magnitude of resistance 49. As explained later, the integrating detectors function so as to permit the integration of the effect of several pulses. Reference numeral 52 designates a shunt motor arranged to drive the commutator of synchroscope 36. Numerals 53 and 54 designate differentially connected supplementary field windings of the shunt motor 52 which are connected between the anodes of the vacuum tubes 42 in the integrating detectors A and B, respectively, and the positive pole of anode supply battery 55. Numeral 56 denotes a low frequency pass condenser connected in shunt to battery 55.

The operation of the direction finding system comprising the transmitter illustrated in Fig. 1 and the receiver illustrated in Fig. 2 may be briefly described as follows. As indicated above, let $F_2$ equal 59 cycles, $F_3$ equal 60 cycles and $F_4$ equal 3000 cycles. Waves of carrier frequency $F_1$ from oscillator 1 and waves of frequency $F_2$ from oscillator 2 are supplied to the input of the balanced modulator 3. The resulting sidebands with suppressed carrier are radiated from loop 4, the currents in the vertical portions of loop 4 being of opposite phase as indicated on the drawings by the designations $F_1-F_2$, $F_1+F_2$ and $180°(F_1-F_2)$, $180°(F_1+F_2)$. Similarly, waves from oscillator 1 and oscillator 2 are supplied to the balanced modulator 5, the phase of the waves from oscillator 2 in this instance being shifted 90° by the phase shifter 6. The sidebands with suppressed carrier obtained from balanced modulator 5 are radiated by loop 7, the phases of the currents in the vertical portions of loop 7 being of opposite phase, that is, 90° $(F_1-F_2)$, 90° $(F_1+F_2)$ and 270° $(F_1-F_2)$, 270° $(F_1+F_2)$, as shown on the drawings. The effect of radiating energy from the vertical portions of loops 4 and 7 in the phase relation shown is to produce a rotating field, as is well understood at the present time, the phase designations shown on the drawings being, of course, only relative. Another set of waves from oscillator 1 of carrier frequency $F_1$ shifted 90° by phase shifter 10 is combined in modulator 9 with currents of frequency $F_3$ from oscillator 8, and the resulting sidebands 90° $(F_1-F_3)$ and 90° $(F_1+F_3)$ and carrier 90° $F_1$ radiated from antenna 12. It should be noted that the non-directional carrier radiated from antenna 12 is in quadrature to the carrier employed in producing the sidebands $F_1-F_2$ and $F_1+F_2$.

The rotating sidebands together with the non-directional sidebands and quadrature carrier radiated from antenna 12 are received on the timing antenna 13 positioned north of the antenna system comprising loops 4 and 7 and non-directional antenna 12. As explained in the above mentioned Patent 1,922,677 the quadrature carrier (90°$F_1$) is of the proper phase to modulate the rotating sidebands. The resulting 59 cycle current produced by modulation of the rotating sidebands with the quadrature carrier in detector 15 and the 60 cycle current obtained by modulation of the carrier and the non-directional sidebands in detector 15 are supplied to filter 16. Filter 16 selects $F_2$ and $F_3$ which are then intermodulated in rectifier 17 to produce frequency $F_3-F_2$, a one cycle current which is a maximum when $F_2$ and $F_3$ momentarily coincide in phase. The leak circuit 18 comprising condenser 21 and resistance 22 functions to indicate when the sum of $F_2$ and $F_3$ has a maximum value. Condenser 21 and resistance 22 have such electrical values that only a small portion of the positive peak of the one cycle current flows through the tube rectifier 17 and is transferred to the secondary winding of transformer 19. The secondary winding of transformer 19 is tuned by means of condenser 20 to a band of harmonic frequencies generated by the distortion of the current flowing through rectifier 17, and these harmonics are selected by tuned circuit 20 and amplified in amplifier 23 as frequency $F_4$, say 3000 cycles to 3300 cycles. The output of amplifier 23 is modulated with the quadrature carrier current in modulator 9 and transmitted non-directionally from antenna 12. The transmission of the sidebands 90° $(F_1-F_4)$ and 90° $(F_1+F_4)$ exists only for a fraction, say one one-hundredths of a second, and these sidebands are employed for synchronizing the rotating field of the synchroscope at the receiver.

At the receiver on the mobile station, the position of the mobile station with respect to the beacon transmitter described above is continuously indicated by means of a synchroscope arrangement. The rotating double sidebands, $F_1 \pm F_2$, the non-directional sidebands 90° $(F_1 \pm F_3)$, the reference non-directional sidebands 90° $(F_1 \pm F_4)$ and the non-directional carrier 90° $F_1$ are all received on antenna 24 and supplied to the input circuit of detector 26 by means of transformer 25.

Modulation in detector 26 of the rotating double side-bands and the quadrature carrier, and of the two sets of non-directional sidebands and the carrier produces, among other components, the frequency component $F_4$ (3000 cycles) and components $F_3$ (60 cycles) and $F_2$ (59 cycles). Transformer 28 having its primary winding tuned by means of condenser 29 serves as a means of supplying frequency components $F_3$ and $F_2$ only, to the input circuit of detector-amplifier 34 and, similarly, transformer 31 having its primary winding 30 tuned by means of condenser 32 functions to transfer to winding 37 only the audio frequency component $F_4$. The phase of the one cycle current in the output of detector amplifier 34 is dependent upon the position of the mobile station with respect to the beacon station and its phase as compared to the phase of the one cycle orienting current in the timing circuit, determines the bearing of the mobile station.

The time when the effective one cycle rotating field is directed north, which is the instant when the one cycle current in the timing circuit has a positive maximum intensity, is determined by a special type synchroscope. The commutator assembly 36 with magnetic poles 45 and 46 mounted thereon is driven by means of shunt motor 52 at a speed of one revolution per second approximately, so that an alternating magnetic field corresponding to the orienting one cycle current is established by the poles 45 and 46. The rotation of commutator assembly 36 is accurately synchronized in both speed and phase with the transmitted rotating field by means of the synchronizing pulse $F_4$ impressed on winding 37 of transformer 31. If the two are in phase synchronism the voltage set up by the synchronizing pulse in winding 37 will be impressed on the input circuit of both of the tubes 42 through segments 39 and 40 and brushes 43 and 44, and the plate circuit variations will not affect the speed of the motor inasmuch as windings 53 and 54 are differentially related. If the commutator assembly 36 is leading in phase, the input circuit of tube 42 in detector B will be energized since the potential in coil 37 resulting from the synchronized pulse will be impressed through brush 38, commutator segment 40, brush 44 across the cathode and grid of this tube. The input circuit of the tube in detector A will not be energized. Consequently, the current in coil 54, only, will be varied and the speed of the motor will be decreased. On the other hand, if the commutator assembly 36 is lagging in phase synchronizing pulse potential will be impressed upon the input circuit of the tube in detector A and the current in coil 53 will be varied so as to increase the speed of the motor.

The electrical values of resistances 49 and 50 and condenser 51 in the integrating detectors are such that several successive pulses must be applied to the input circuits of either of tubes 42 in order to produce a large change in the speed of the commutator assembly 36. When the commutator assembly is in synchronism with the transmitted rotating field, poles 45 and 46 will have the position shown on the drawings. The pointer on the synchroscope will indicate the position of the magnetic poles when the one cycle current in winding 35 obtained from detector-amplifier 34 is a maximum, and hence the angular position of the mobile station with respect to the beacon and timing antenna 13 is continuously indicated.

Referring now to Fig. 3, a transmitter designed to produce a one cycle rotating field in a manner slightly different from that described in connection with Fig. 1 is illustrated. Reference numeral 57 designates a radio frequency oscillator generating a frequency $F_1$ and numeral 58 designates a low frequency oscillator generating a frequency $F_2$, $F_2$ being any convenient audio frequency, say 100 cycles. Oscillators 57 and 58 are connected to balanced modulator 59, the output circuit of which is connected to a loop 60 arranged to rotate at a speed of one revolution per second. For simplicity the means employed for causing the loop 60 to rotate have been omitted from the drawings. Oscillator 57 is also connected to an unbalanced modulator 61 through the phase shifter 62. Numeral 63 represents a timing antenna inductively coupled by means of transformer 64 to a timing circuit 65 which is similar to that shown in Fig. 1. The timing circuit 65 is also connected to modulator 61 and the output terminals of modulator 61 are associated by means of transformer 66 with the non-directional antenna 67.

In operation, double sidebands obtained from the balanced modulator 59 by modulation of the waves from oscillators 57 and 58 are radiated from the vertical portions of loop 6, the phases of the current in these portions being opposite as shown in the drawings by the designations $F_1-F_2$, $F_1+F_2$ and 180° $(F_1-F_2)$, 180° $(F_1+F_2)$. A carrier wave of frequency $F_1$ from oscillator 57 is shifted by means of phase shifter 62, 90° with respect to the carrier supplied to the balanced modulator 59 and then radiated from antenna 67, modulator 61 being unbalanced.

The transmitted sidebands together with the quadrature carrier are received on antenna 63 and inductively transferred by means of transformer 64 to the detector in the timing circuit 65. When loop 60 is pointed in a predetermined direction, north, for example, the one cycle current in the output of the detector in the timing circuit 65 resulting from the one cycle recurrence of the detected frequency $F_2$ will have a positive maximum intensity. As in the timing circuit shown in Fig. 1, a 3000 cycle pulse ($F_4$) is, at the instant of maximum value, combined with waves from oscillator 57 in the unbalanced modulator 51, the resulting sidebands and carrier being radiated from antenna 57 at that instant. A receiver similar to that shown in Fig. 2 is employed in connection with the transmitter shown in Fig. 3.

The apparatus shown at the left of the line X—X in Fig. 3 may be replaced by that shown in Fig. 4, Fig. 5 or Fig. 6. Referring to Fig. 4, it will be seen that the loop 68 rotating once per second radiates, bilaterally, the sidebands $F_1-F_2$ and $F_1+F_2$, the sidebands being supplied to the antenna by means of transformer 69. The quadrature carrier 90° $F_1$ and the timing sidebands 90° ($F_1-F_4$) and 90° ($F_1+F_4$) are inductively transferred to the antenna system by means of transformer 66 and radiated non-directionally by means of loop 68.

The antenna of Fig. 5 is self explanatory and very similar to that shown in Fig. 3. The sideband energy in the rotating loop 60, however, is not directly radiated to produce the rotating field. It is transferred inductively to four vertical antennas 70 in proper phase relation as indicated on the drawings so as to produce double rotating sidebands. The quadrature carrier and timing sidebands are radiated from the non-directional antenna 67.

In Fig. 6 two crossed loops 71 are employed, the double sideband energy in the rotating loop 60 being inductively transferred to these cross loops to produce the rotating field. Reference numerals 72 designate impedances each of which is associated with a different loop 71. The quadrature carrier 90° $F_1$ and the timing sidebands 90° ($F_1-F_4$) and 90° ($F_1+F_4$) are supplied through these impedances 72 to the vertical portions of loop 71 and radiated non-directionally. Although the invention has been described in connection with certain antenna systems, synchronizing systems, timing circuits, phase comparison devices and other apparatus it is not to be limited to the specific apparatus disclosed; and it should be understood that other antenna arrangements and apparatus may be employed without exceeding the scope of the invention.

What is claimed is:

1. In a radio system, means for bilaterally and rotatably transmitting a double side band wave, and means for non-directively transmitting a carrier in quadrature to the carrier component included in said double side band wave.

2. In a direction finding system, an antenna comprising two perpendicularly crossed loops and a non-directional radiating element positioned at the center of said antenna, means for supplying double sideband currents with negligible carrier connected to said crossed loops so as to produce a rotating beam, means for supplying different double sideband currents and carrier current connected to said radiating element, the last mentioned carrier current being in quadrature to that employed for producing the first mentioned double sideband currents and in phase with that employed for producing the second mentioned double sideband currents, and the frequency difference between the first and second mentioned double sideband currents being relatively small.

3. In a direction finding system, means for producing a slowly rotating orienting beam comprising a slowly rotating loop and a non-directional antenna element positioned between the vertical portions of said loop, means for supplying oppositely phased double sideband currents with negligible carrier to the vertical portions of said loop, and means for supplying to said antenna element carrier waves in quadrature with the negligible carrier.

4. In a direction finding system, means for producing a slowly rotating orienting wave comprising a slowly rotating loop, means connected thereto for supplying oppositely phased double sideband currents to the vertical portions of said loop, another means connected thereto for supplying in-phase carrier current to said vertical portions in quadrature to the carrier employed for producing the sidebands.

5. In a direction finding system antenna structure for producing a slowly rotating orienting wave comprising a slowly rotating loop, said structure including a stationary portion for producing a non-directional wave, two crossed loops inductively associated with said loop, means connected to the rotating loop for supplying oppositely phased double sideband currents to the vertical portions thereof, and means connected to said stationary portion and arranged to supply in-phase carrier currents thereto in quadrature to the carrier employed for producing the sidebands.

6. In a direction finding system, means for producing a slowly rotating wave comprising a slowly rotating loop, two crossed loops inductively associated therewith, four radiating elements each positioned at the corners of a square and connected to one side of one of the crossed loops, a non-directional antenna positioned at the center of said square, means for supplying oppositely phased double sideband currents to the vertical portions of the rotating loop, means for supplying carrier current to the non-directional antenna in quadrature to the carrier current employed in producing the sidebands.

7. In a direction finding system, a beacon station comprising means for producing waves of different frequency, a radiating system connected thereto for rotatably transmitting one wave and non-directional transmitting another wave, an antenna for receiving said waves positioned in a known direction from said station, a detector connected to the antenna, timing means connected between the detector and radiating system, said timing means supplying signal waves to the radiating system whenever the detected beat frequency current has a maximum amplitude of a certain polarity.

8. In a direction finding system, means for transmitting a slowly revolving beam, and a signal, when said beam has a given direction, means for receiving said beam and signal, and a synchroscope connected to the receiving means for automatically indicating the direction of the beam at the time of its reception with respect to its direction at the time of transmission of the signal.

9. In a direction finding system, a beacon station comprising means for producing and transmitting rotating double sideband waves and a non-directional carrier wave, a fixed receiving station positioned in a known direction from said beacon station and having means for modulating said waves, a mobile receiving station having means for modulating said waves, and means for comparing the phase of the modulation resultant of the waves received at the mobile station with the modulation resultant of the waves received at the fixed station.

10. In a direction finding system, a beacon station comprising means for producing and transmitting rotating double sideband waves and non-directional carrier waves in quadrature to the carrier employed for producing the sideband waves, a fixed receiving station comprising a modulator positioned in a known direction from the beacon station, a mobile receiving station comprising a detector and a synchroscope, means for synchronizing the rotating field of the synchroscope with the modulator output at the fixed station, and means for supplying the modulator output at the mobile station to the rotor winding of the synchroscope.

11. In a direction finding system, a beacon station comprising a first means for producing a first double side band wave and a carrier wave, a second means for producing a second double side band wave having a negligible carrier in quadrature to the first mentioned carrier, the frequency difference between the first and second double side band waves being of the order of one cycle, a non-directional antenna element connected to the first wave producing means, a pair of spaced antennæ for producing a rotating beam connected to the second means, a fixed receiving means comprising an antenna, a detector and a rectifier, said receiving means positioned relatively close to and in a known direction from said beacon station and arranged to supply to the non-directional antenna element a synchronizing pulse when the one cycle current has a maximum value, a mobile receiving station arranged to receive the waves and synchronizing pulse comprising a detector and a synchroscope, the synchroscope having its rotating stator field controlled by the received pulse and its rotor energized with the one cycle current detected at the mobile station, whereby the position of said mobile station with respect to the beacon station is continuously and automatically indicated.

12. In a direction finding system, a beacon station comprising wave producing means and radiating means for establishing a plurality of radio fields from which a one cycle current having a directive phase characteristic is obtainable, a fixed receiving antenna located in a known direction from said station, and a timing circuit comprising a detector and included between said antenna and radiating means for obtaining from said fields a one cycle current and supplying to said radiating means a signal pulse whenever the one cycle current has a maximum value of a certain polarity.

13. In a direction finding system, means for producing a plurality of waves, antenna structure connected thereto for transmitting a rotating wave and a non-directional wave, means located in a known direction from said first means for receiving and obtaining from said waves a current component having a directive phase characteristic, said last means connected to the antenna structure and adapted to supply thereto a signal wave when the component reaches a maximum value of a certain polarity.

14. In a direction finding system, an antenna comprising two perpendicularly crossed loops and a non-directional element positioned at the center of said antenna, means for supplying double side band current with negligible carrier to said crossed loops so as to produce a rotating beam, means for supplying different double side band current and carrier current connected to said non-directional element, the last mentioned carrier current being in quadrature to that employed for producing the first mentioned double side band current and in phase with that employed for producing the second mentioned double side band current, the difference frequency between the double side band currents being one cycle, a receiving antenna located in a known direction from said station, a timing circuit comprising a detector and included between said antenna and element for supplying to said element a signal pulse when the difference frequency current has a maximum value of a certain polarity.

JOHN W. GREIG.